April 7, 1942.   J. SMART   2,278,950
HAMPER BASKET TRUCK
Filed May 4, 1940
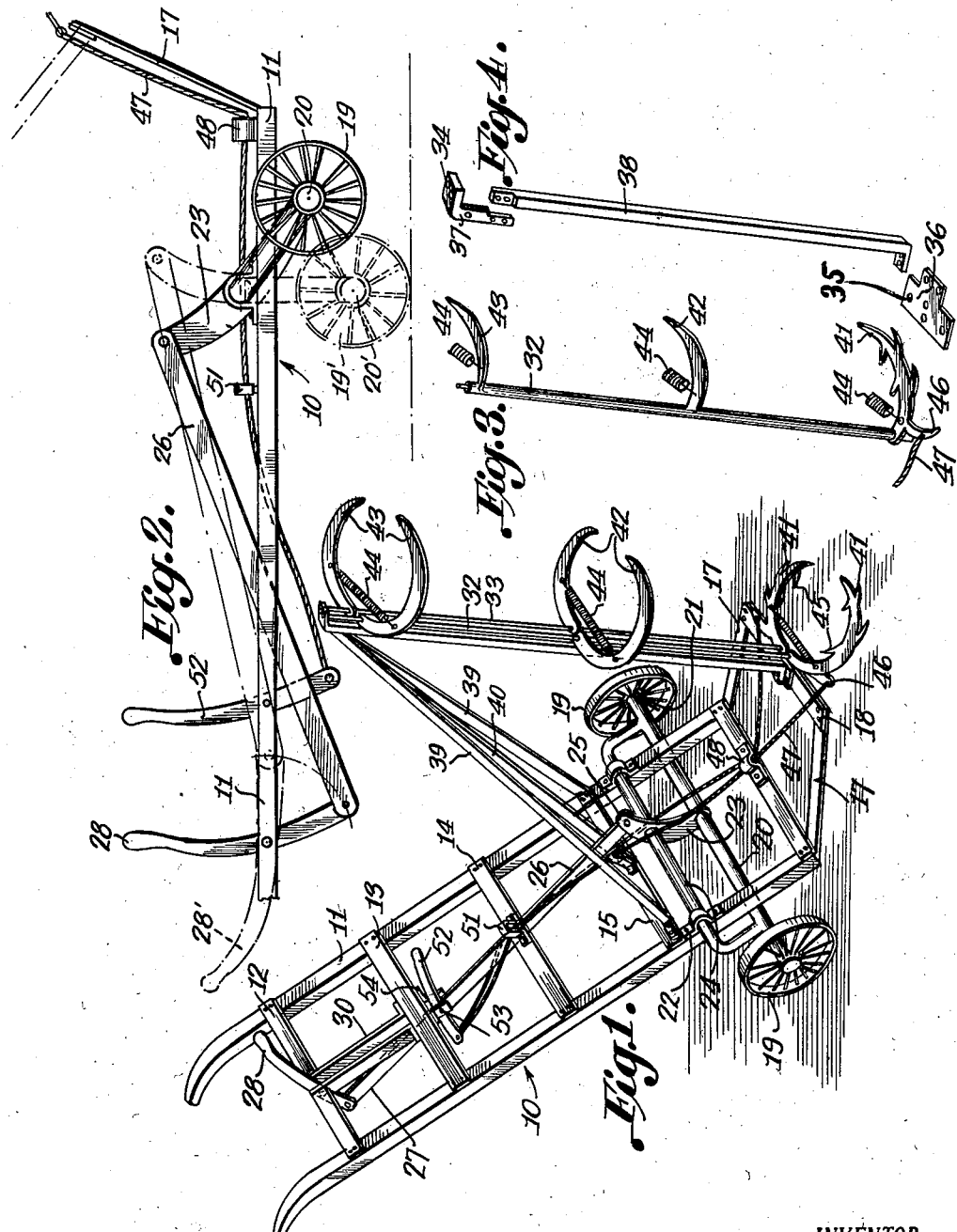
INVENTOR.
Joy Smart.
BY Miller & Miller.
ATTORNEYS.

Patented Apr. 7, 1942

2,278,950

UNITED STATES PATENT OFFICE 2,278,950

HAMPER BASKET TRUCK

Joy Smart, Thomasville, Ga.

Application May 4, 1940, Serial No. 333,311

4 Claims. (Cl. 214—65.5)

This invention relates to a hamper basket truck and has for an object to provide an improved hand truck for handling hamper baskets, and other containers of generally similar nature.

A further object of this invention is to provide a hamper truck which can pick up a group of stacked baskets conveniently from one position to another with the hamper baskets retained in super-imposed vertical position while the truck itself is at a convenient angle for handling.

A further object of this invention is to provide a hamper basket truck which is an improvement on those shown in Patent Nos. 1,424,819, 1,243,200 and 993,008.

With the foregoing and other objects in view as will hereinafter become apparent, this invention comprises the combinations of constructions and arrangements of parts hereinafter claimed, set forth, and illustrated in the accompanying drawing, wherein:

Fig. 1 is a perspective view of the hamper basket truck of this invention in a position to pick up a group of stacked baskets.

Fig. 2 is a side elevation view of the truck and truck moved to a horizontal position for carrying the baskets at an angle.

Fig. 3 is an elevation view of one of the hook claw members and

Fig. 4 is a perspective view of the claw member bearing in a disassembled position.

There is shown at 10 the hamper truck of this invention. This truck 10 has a more or less conventional design, the truck frame consisting of side handle bars 11 connected together by a plurality of cross bars 12, 13, 14, 15, and 16. Projecting forwardly from the bottom of the handlebars 11 at cross bar 16 is a pair of conventional toe bars 17 connected by a conventional cross brace 18. The wheels 19 are journaled on an elbow axle 20 which is in the form of a D member having extended axles 21 for the wheels. The elbow axle 20 is secured to the handlebars 11 by means of U clamps 22 fastened thereto. The elbow axle 20 may be moved from the position shown in Fig. 1 to the position shown at 20' in Fig. 2 by moving the rocker bar 23 pivoted on the D arm 24, one end thereof being secured to the middle of the axle 20 and the other end being pivoted at 25 to a link bar 26.

The other end of the link bar 26 is pivotally secured at 27 to a rocker arm 28 journaled in the brace 12. Vertical braces 30 connect the cross bar 13 to the cross bar 7 to reinforce the bar 12. By shifting the rocker arm 28 to the position shown at 28' in Fig. 2, the axle 20 and wheels 19 are shifted to the position 20' and 19'. When utilizing the truck as shown in Fig. 1, the wheels are preferably kept in the position 19 as when carrying a stack of baskets in a vertical position. When the truck body 10 is to be carried in a horizontal position as shown in Fig. 2, the operator may find it more convenient to have the wheels in the position 20', thus keeping the truck body further from the floor 31 and in more convenient handling position.

In order to hold a group of stacked baskets, a pair of complementary claw members 32 and 33 are provided, these claw members being pivoted in bearing apertures 34 and 35. The bearing apertures 35 are in a bearing plate 36 fastened to the cross brace 18, while the bearing apertures 34 are in a bearing plate 37 fastened to the upper end of a supporting rod 38. A pair of outer brace bars 39 and an intermediate brace bar 40 are fastened to the upper ends of the supporting rod 38 and bearing plate 34 which in turn are fastened at their lower ends to the truck frame bar 15 as shown.

Each of the claw members 32 and 33 are provided with curved hook arms 41, 42 and 43. Each member of these pairs of hook arms 41, 42 and 43 are connected to each other by means of a resilient spring 44 tending to draw the members of each pair together. The curvature of these arms are such that when drawn together they will snugly embrace the hamper basket which they are intended to carry. The lower pair of hooks 41 are each provided with barbs 45 to insure that the lowermost basket of the stack will be positively held against dropping therethrough which in turn will insure proper support for the rest of the baskets of the stack.

The outside of each hook arm 41 is provided with a finger 46 to which is fastened a control wire 47. The control wires 47 pass through U clamp 48 on cross bearing 16 and guide ring 51 on cross bars 14 and 15 and are fastened to the end of the control handle 52 which is pivoted at 53 between a pair of angle bars 54 fastened to the cross brace 13.

When in operation, the hamper baskets are picked up by merely pivoting the control bar 52 about its pivot 53 causing the control wires 47 to withdraw the hook members 41, 42 and 43 away from each other against the yieldable springs 44. In this position, the truck 10 is moved so as to cause the hooks to embrace the stack of hamper baskets, the hooks being so spaced that each pair will embrace one of the hamper baskets stacked three high.

On releasing the control handle 52, the springs 44 cause the hook members of each pair to come together and securely hold the hamper baskets in stacked position and they may then be picked up by the truck maintained in a vertical position, which is especially useful if the baskets are open and have no covers thereon. If the baskets are still closed and with covers on them, the truck may be tilted to the position shown as in Fig. 2 in which case, the wheels may be moved to the position shown at 20' in a more nearly horizontal position and therefore more easily moved by the operator.

The novel features and the operation of this device will be apparent from the foregoing description. While the device has been shown in detail, it is obvious that this invention is not to be considered limited to the exact form disclosed, and that changes may be made therein within the scope of what is claimed, without departing from the spirit of the invention.

Having thus set forth and described the invention, what is claimed is:

1. A hamper basket truck comprising a hand truck, a plurality of pairs of basket-embracing claw members for individually embracing a plurality of superposed baskets, bearing means in which said claw members are pivoted, brace means mounting said bearing means on said truck, yieldable means connecting said claw members and urging them toward each other to a basket embracing position, and control means withdrawing said claw members from each other to basket releasing position.

2. A hamper basket truck comprising a hand truck, a plurality of pairs of basket-embracing claw members, bearing means in which said claw members are pivoted, brace means for mounting said bearing means on said truck, yieldable means connecting said claw members and urging them toward each other to a basket-embracing position, control means withdrawing said claw members from each other to basket releasing position and barbed means on the lowermost pair of claw members insuring a firm grip on the lowermost basket of a stack of baskets.

3. A hamper basket truck comprising a hand truck, a plurality of pairs of basket-embracing claw members, bearing means in which said claw members are pivoted, brace means for mounting said bearing means on said truck, yieldable means urging said claw members toward each other to a basket-embracing position, and control means withdrawing said claw members from each other to basket releasing position, said control means comprising a finger on each of the lowermost claw members, a cable means secured to said finger and a control handle to which said cables are secured, said control member being pivoted whereby operation of said control member about its pivot pulls said cable means to withdraw said claw members from each other.

4. A hamper basket truck comprising a hand truck, a plurality of pairs of basket-embracing claw members, bearing means in which said claw members are pivoted, brace means mounting said bearing means on said truck, yieldable means connecting said claw members and urging them toward each other to a basket-embracing position, control means withdrawing said claw members from each other to a basket releasing position, a pair of bearing wheels for said truck, an elbow axle member on which said axle members are journaled, and means for moving said elbow axle member to either of two operative positions, said moving means comprising a rocker arm secured to said axle member, a link pivoted to one end of said rocker arm and a manually operable control handle journaled on said truck between the truck handlers and pivotally fastened to the end of said link.

JOY SMART.